(12) United States Patent
Lemcke

(10) Patent No.: US 8,819,950 B1
(45) Date of Patent: Sep. 2, 2014

(54) RELEASABLE TIP FOR A CHALK LINE REEL SET

(76) Inventor: Dan Lemcke, Clarksville, TN (US)

( * ) Notice: Subject to any disclaimer, the term of this patent is extended or adjusted under 35 U.S.C. 154(b) by 255 days.

(21) Appl. No.: 13/561,789

(22) Filed: Jul. 30, 2012

(51) Int. Cl.
*B44D 3/38* (2006.01)
*B44D 3/00* (2006.01)
*G01B 3/10* (2006.01)

(52) U.S. Cl.
USPC .................. 33/414; 33/413; 33/755; 33/756; 33/758

(58) Field of Classification Search
USPC ............... 33/414, 242, 413, 755, 756, 758
See application file for complete search history.

(56) References Cited

U.S. PATENT DOCUMENTS

| 2,513,256 | A | * | 6/1950 | Sonnenburg | 294/82.24 |
| 5,937,532 | A | * | 8/1999 | Eirich et al. | 33/758 |
| 6,931,743 | B1 | | 8/2005 | Scarborough | |
| 7,506,454 | B1 | | 3/2009 | Balliet | |
| 7,676,941 | B2 | | 3/2010 | Cruz et al. | |

* cited by examiner

*Primary Examiner* — Peter Macchiarolo
*Assistant Examiner* — Rhyan C Lange
(74) *Attorney, Agent, or Firm* — Phillip E. Walker; Waddey Patterson, P.C.

(57) ABSTRACT

A chalk line apparatus having a line and spool and a releasable end. The releasable end comprises a hook member having a rod member, a releasable member pivotally attached to the rod member and a spring positioned to bias the releasing member against the hook member. The releasing member has an attachment location for the line. Additionally, the spring is sized and shaped to allow rotation of the releasing member about the rod member and relative to the hook member upon a force exerted at the attachment location from the line.

18 Claims, 5 Drawing Sheets

RELEASABLE TIP FOR A CHALK LINE REEL SET

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

FIELD OF THE INVENTION

The present invention relates generally to a releasable attachment for use at/with the free end of line tools. More particularly, a releasable attachment or hook used in association with chalk lines.

BACKGROUND OF THE INVENTION

Generally, in the construction and carpentry trades, a straight line is needed for manipulating a work piece. This straight line enables skilled tradesmen to practice their craft. Generally, a device called a chalk line is used to mark a straight line on a work piece from which the skilled worker can manipulate the work piece as desired. This task can include cutting large pieces of material, laying flooring over a surface, attaching post or ends together, placing shingles upon a roof, and the like.

A chalk line typically includes a length of line that is coated with chalk and attached around a spool. The spool typically has a case, or housing, around it where additional chalk may be stored. The housing includes a handle for winding the line on the spool and typically has a free end extending outside the housing. Movement of the string in and out of the housing typically applies additional chalk to the line. The free end of the line conventionally has a hook with one or more openings that allow placement of the hook on a work piece and in some instances marking of the work piece through the opening.

The chalk line is used to mark a line for a desired purpose to assist the skilled worker. A line is unwound off the reel out of the housing and stretched between two previously marked points. The hook end is typically secured to the work piece and the worker holds the housing in one hand and runs the line along the length of the work piece at the desired location for the straight edge as needed. Once in position, the worker will raise and quickly release the line, in a snapping action, whereby chalk from the line is deposited upon the work piece. Typically it is then desirable to rewind the line around the spool within the housing to rechalk the line and secure it before the next use. The chalk line left on the work piece can be utilized for performing the desired actions.

The operation issues can arise in the release of the hook of the free end of the chalk line from the work piece once the chalk line is snapped into place. This is especially true when the work piece is on an incline surface, such as a roof.

Many attempts in the industry have been directed at securing the hook end into the work piece through attachments such as locking armatures, nails, screwed posts, and the like. Few attempts have been directed at removably securing the hook into the work piece such that one person can both secure the hook to the work piece and release it therefrom without having to physically grab the hook end and lift it from the work piece.

What is needed then is a new chalk line apparatus having a releasable attachment that allows a user of the chalk line apparatus to removably secure the chalk line to a work piece. Preferably this improved apparatus and attachment end allows for a user of the chalk line to disengage the attachment end from the work piece without having to physically grab and lift the hook from the work piece. This needed device is lacking in the art.

BRIEF SUMMARY OF THE INVENTION

Included herein is a chalk line apparatus having a line and spool and a releasable end. The releasable end comprises a hook member having a rod member, a releasable member pivotally attached to the rod member and a spring positioned to bias the releasing member against the hook member. The releasing member has an attachment location for the line. Additionally, the spring is sized and shaped to allow rotation of the releasing member about the rod member and relative to the hook member upon a force exerted at the attachment location from the line.

The hook member can further include support stanchions where the rod member is attached to and positioned between the support stanchions. Additionally the hook member can further include an engagement location sized to engage the work piece. The hook member can include a base position opposite the engagement location and a pair of armatures extending from the base to the engagement location. The base, armatures, and engagement location can define an aperture in the hook member where the aperture is sized to accept at least a portion of the releasing member. The releasing member can further include a protuberance sized to fit within the aperture and engage the work piece when the work piece is positioned proximate to the engagement location absent the force exerted at the attachment location for the line.

Also included is a releasable end used with the line on a work piece. The releasable end can comprise an attachment member, a releasing member, and a spring member. The attached member can include a rod member, an engagement location sized to engage a work piece and an aperture. The releasing member can be pivotably attached to the rod member and have a force location shaped to accept a line and a protuberance sized to fit within the aperture. The spring member can be positioned to bias a releasing member against the attachment member. The releasable end can further include an attaching position and a releasing position wherein the protuberance is positioned with the aperture when the releasable end is positioned in the releasing position and the protuberance is spaced from the engagement location when the releasable end is positioned in the attaching position.

The attachment member can further include a base position opposite the engagement location and a pair of armatures extending from the base to the engagement location wherein the base, armatures, and engagement location define the aperture in the hook member. These armatures can also define a plane between the base and engagement member. The plane can be positioned between the protuberance and the engagement location when the releasable end is positioned in the attaching position and the protuberance can be positioned on the same side of the plane as the engagement location when the releasable end is positioned in the releasing position.

It is therefore a general object of the current disclosure to provide a new chalk-line apparatus.

Another object of the current disclosure is to provide a releasable attached end for a chalk line apparatus.

Another object of the current disclosure is to provide a releasable end for a chalk line apparatus that allows a user of the chalk line apparatus to disengage that releasable end without having to touch that releasable end and lift it from the work piece.

Another object of the current disclosure is to provide a releasable end for a chalk line apparatus that can disengage itself from the work piece upon a change in the application of a force to that releasable end from the line that is part of that chalk line apparatus.

Other and further objects, features and advantages of the present disclosure will be readily apparent to those skilled in the art upon reading of the following disclosure when taken in conjunction with the accompanying drawings.

BRIEF DESCRIPTION OF THE SEVERAL VIEWS OF THE DRAWINGS

In FIG. 3 the releasable end is shown in a releasing position.

In FIG. 7 a line and work piece are shown in relation to the releasing end of the chalk line apparatus in an attaching position.

In FIG. 9 a line and work piece are shown in relation to the releasing end of the chalk line apparatus in a releasing position.

DETAILED DESCRIPTION OF THE INVENTION

Figure 1:
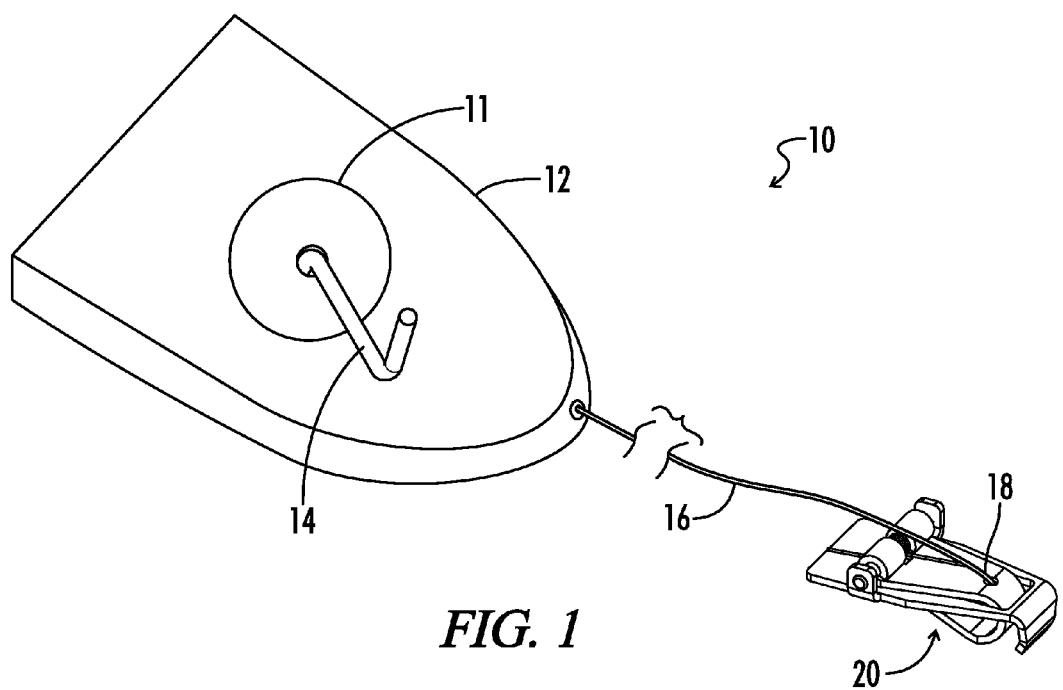
FIG. 1 is a perspective view of a chalk line apparatus made in accordance with the current disclosure.
Figure 2:
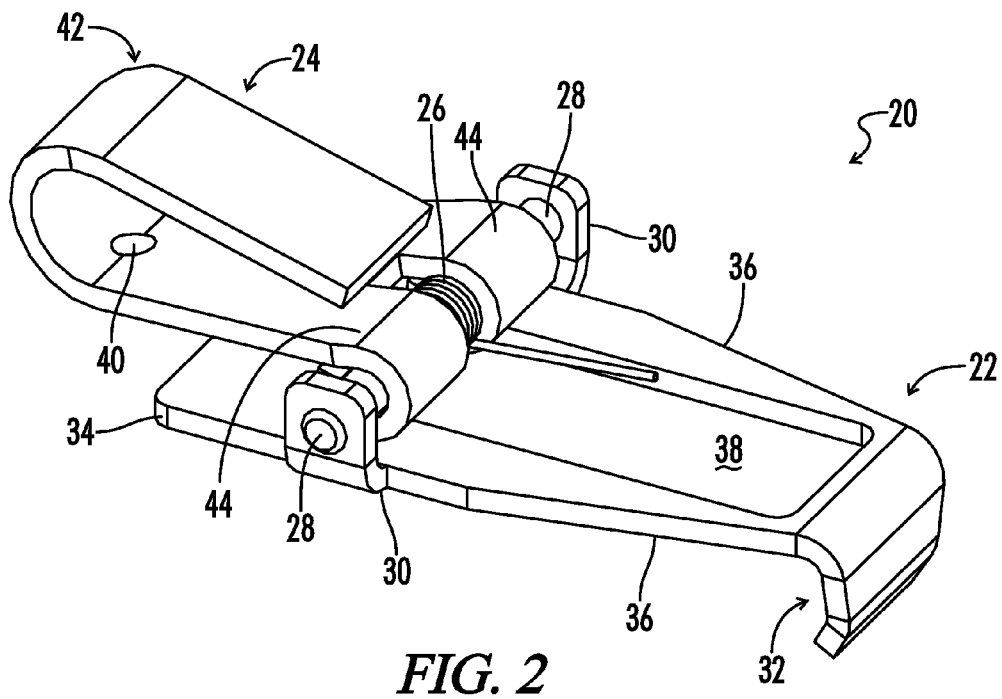
FIG. 2 is a perspective view of a releasable end made in accordance with the current disclosure shown in a attaching position.
Figure 3:
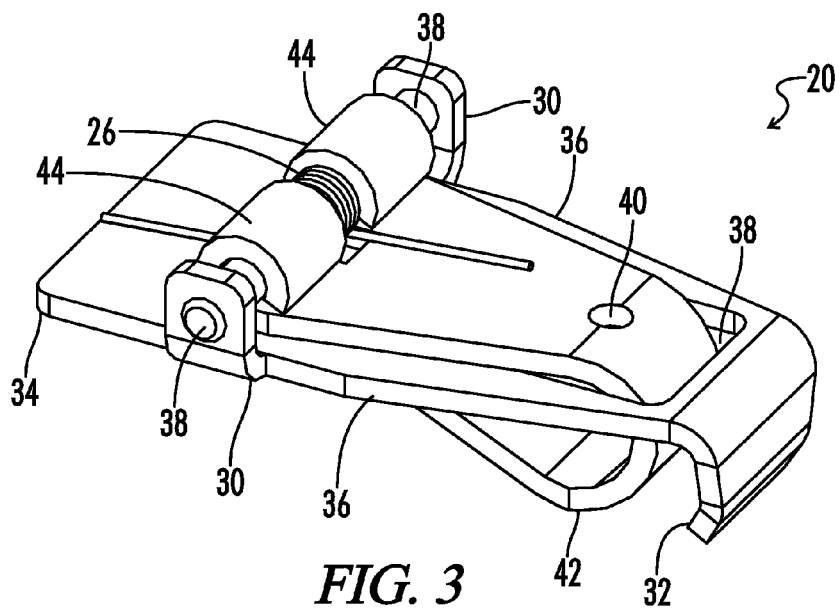
FIG. 3 is a top perspective view of a releasable end made in accordance with the current disclosure.

Referring generally now to FIGS. 1-9 a chalk line apparatus is shown and generally designated by the numeral 10. The chalk line apparatus 10 includes a housing 12 and a handle 14. The housing 12 has a spool 11 with at least a portion of the spool 11 located within the housing 12. The handle 14 is attached to the spool 11 for winding a line 16 within the spool 11. The line 16 includes a free end 18 having a releasable end 20 attached thereto. The line 16 typically has chalk attached to it. The housing 14 can stored chalk to reapply the chalk to the line 16 as the line 16 is collected around the spool 11 by the handle 14. The chalk line apparatus 10 is typically used in conjunction with a work piece 19 to mark a straight line on the work piece 19.

The releasable end 20 includes a hook member 22, a releasing member 24, and a spring 26. The hook member 22 which can also be described as an attachment member 22, includes a rod member 28 and support stanchions 30. The rod member 28 can be attached to and positioned between the support stanchions 30. The hook member 22 can further include an engagement location 32, or gripping location 32, that is sized to engage the work piece 19. The hook member 22 can further include a base 34 positioned opposite the engagement location 32 and a pair of armatures 36 extending from the base 34 to the engagement location 32. The base 34, armatures 36 and engagement location 32 can define an aperture 38 in the hook member 22. Preferably the aperture 38 is sized to accept at least a portion of the releasing member 24.

The releasing member 24, or knuckle 24, can be pivotally attached to the rod member 28 and include a line attachment location 40 for attachment of the line 16 to the releasable end 20. The line attachment location 40 can also be described as a force location 40. The releasing member 24 can further include a protuberance 42 sized to fit within the aperture 38 of the hook member 22. The protuberance 42 is sized to engage the work piece 19 when the work piece 19 is positioned proximate to the engagement location 32 absent a force 17 exerted at the line attachment location 40 from the line 16. Split armatures 44 of the releasing member 24 can wrap around the rod number 28 and secure the releasing member 24 to the rod member 28.

The spring 26 can be positioned to bias the releasing member 24 to engage the hook member 22. In this embodiment, the spring 26 can push a portion of the releasing member 24 against the hook member 22, such as the split armatures 44 of the releasing member 24 against the armatures 36 of the hook member 22. The spring is preferably sized and shaped to allow rotation of the releasing member 24 about the rod member 28, and relative to the hook member 22, upon a force 17 exerted at the line attachment location 40 from the line 16. The spring can be multiple springs known in the art, but is preferably a coil type spring. The spring is preferably positioned around the rod number 28 and between the support stanchions 30. Spring 26 can further be positioned between the split armatures 44 of the releasing member 24.

In operation the releasable end 20 includes a releasing position, as best illustrated in FIGS. 3, 5, 8, and 9. The releasable end 20 also includes an attaching position as best illustrated in FIGS. 2, 4, 6, and 7. In the attaching position, the releasing member 24 is spaced from the engagement location 32. In the releasing position, the releasing member 24 is positioned within the aperture 38. More specifically, the protuberance 42 of the releasing member 24 can be positioned within the aperture 38 when the releasable end 20 is positioned in the releasing position and the protuberance 42 is spaced from the engagement location 32 when the releasable end 20 is positioned in the attaching position.

Alternately described, the armatures 36 of the hook member 22 can define a plane 46 between the base 34 and engagement location 32. This plane 26 can be positioned between the protuberance 42 and the engagement location 32 when the releasable end is positioned in the attaching position. The protuberance 42 can be positioned on the same side of the plane 46 as the engagement location 32 when the releasable end 20 is positioned in the releasing position.

Figure 4:
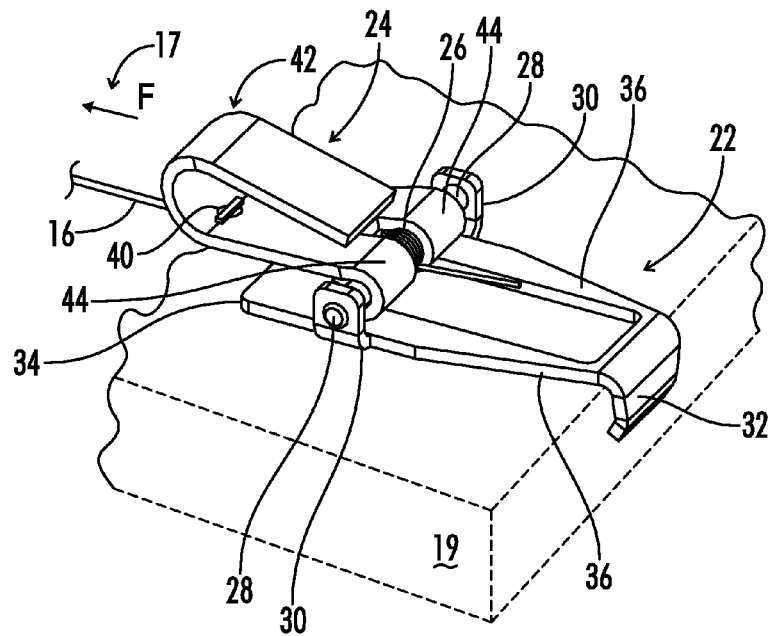
FIG. 4 is a perspective view similar to FIG. 2 shown with a work piece and line applying a force to position the releasable end in an attaching position.
Figure 5:
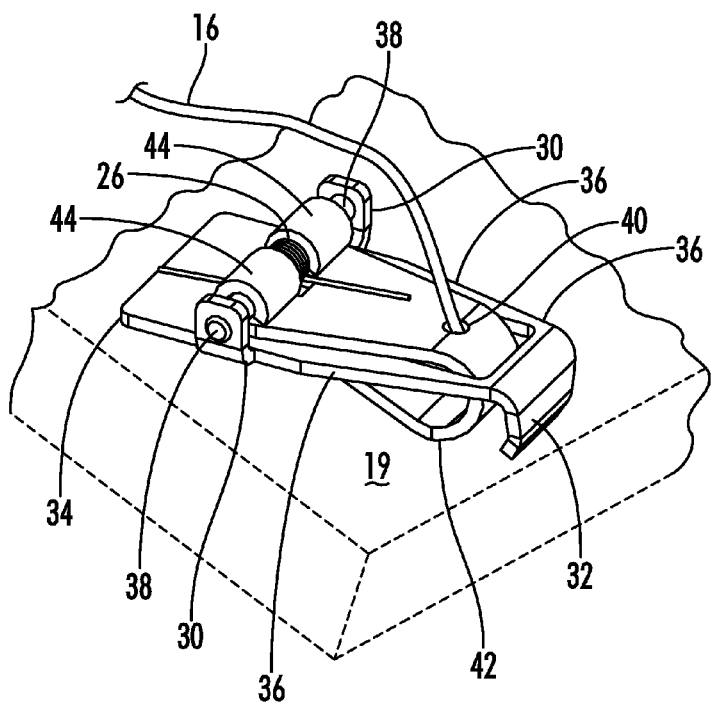
FIG. 5 is a top perspective view similar to FIG. 3 shown with a line releasing its force to disengage the releasable end from the work piece.
Figure 6:
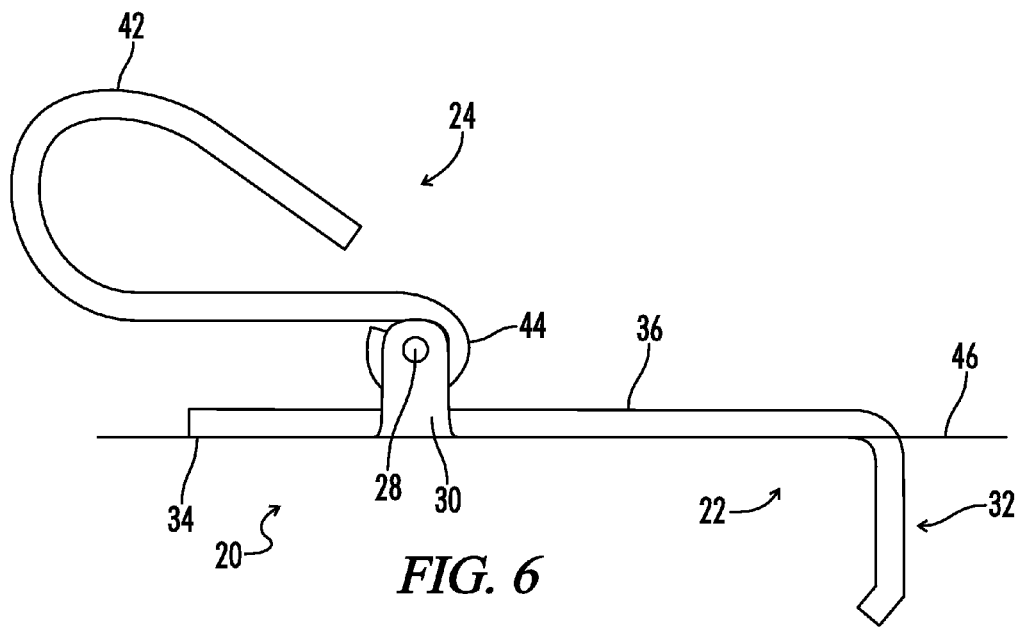
FIG. 6 is a side view of a releasable end made in accordance with the current disclosure.
Figure 7:
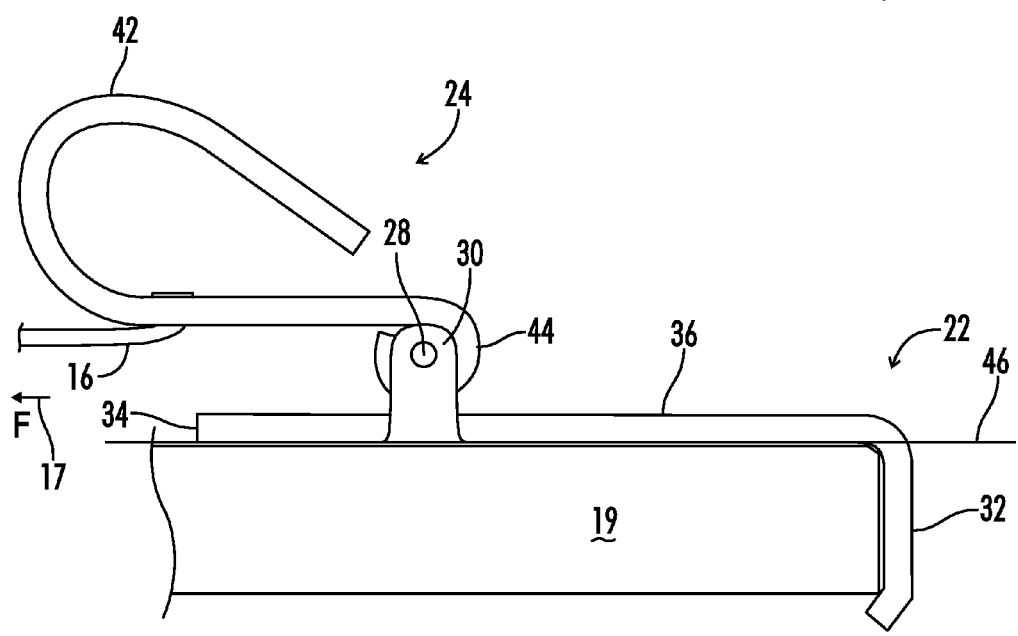
FIG. 7 is a side view similar to FIG. 6.
Figure 8:
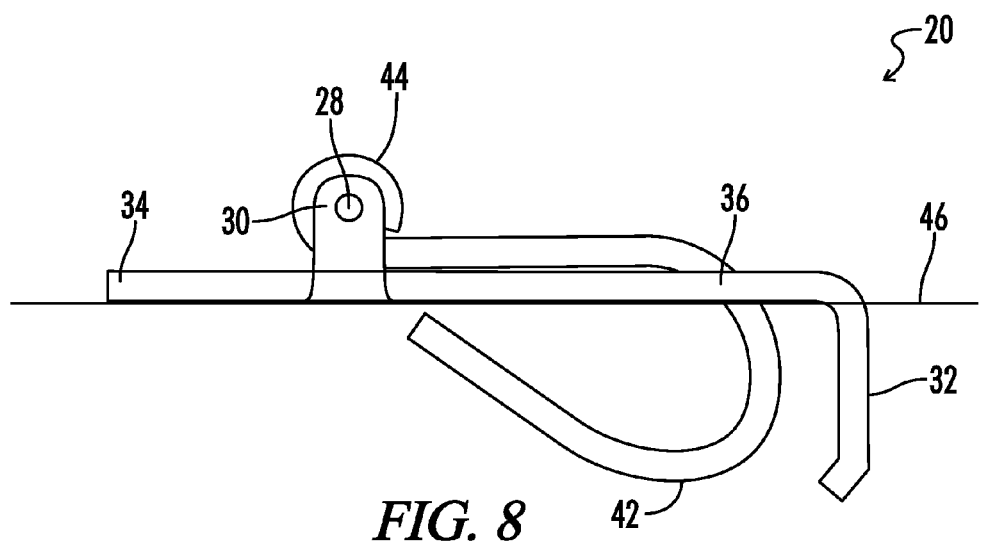
FIG. 8 is a side view of a releasing end shown in a releasing position.

In operation, a user of the chalk line apparatus 10 will attach the releasable end 20 to the work piece 19. The user will apply a force 17 through the line 16 to maintain the spacing of the releasing member 24 and the hook member 22 such that the protuberance 42 of the releasing member 24 does not engage the work piece 19. This is best illustrated in FIGS. 4 and 7. The user of the chalk line apparatus 10 will maintain this force 17 and snap the line 16 to create the chalk line on a work piece 19.

Figure 9:
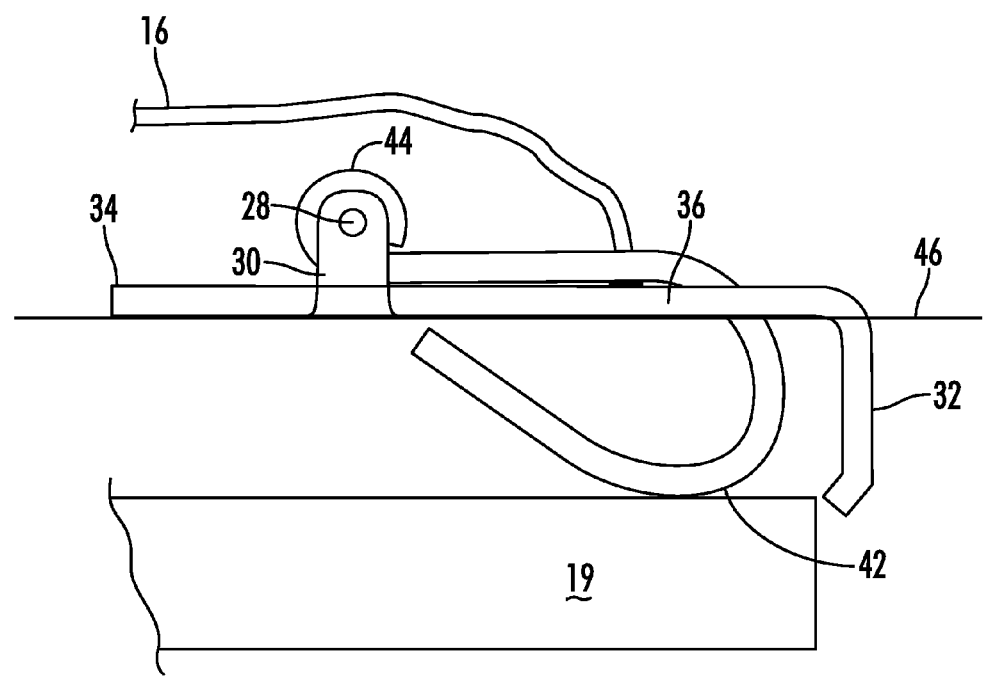
FIG. 9 is a side view similar to FIG. 8.

Once completed the user will relax the force 17 on the line 16 allowing the spring 26 to move the releasing member 24 into engagement and/or into contact with the work piece 19. This effectively forces the hook member 22 off the work piece 19 and disengages the releasable end 20 from the work piece 19. At that point the user is free to respool the line 16 into the housing 12. This engagement and releasing is best illustrated in FIG. 9.

Thus, although there have been described particular embodiments of the present invention of a new and useful Releasable Tip For A Chalk Line Reel Set it is not intended that such references be construed as limitations upon the scope of this invention except as set forth in the following claims.

What is claimed is:

1. A releasable end for a chalk-line apparatus having a line and spool, the chalk-line apparatus for use on a work piece, the releasable end comprising:
   a hook member having a rod member;
   a releasing member pivotally attached to the rod member and having an attachment location for the line;
   a spring positioned to bias the releasing member against the hook member, the spring sized and shaped to allow rotation of the releasing member about the rod member and relative to the hook member upon a force exerted at the attachment location from the line.

2. The releasable end of claim 1, the hook member further including support stanchions and the rod member is attached to and positioned between the support stanchions.

3. The releasable end of claim 1, the hook member further including an engagement location sized to engage the work piece.

4. The releasable end of claim 3, the hook member further including a base positioned opposite the engagement location and a pair of armatures extending from the base to the engagement location, the base, armatures, and engagement location defining an aperture in the hook member.

5. The releasable end of claim 4, the aperture sized to accept at least a portion of the releasing member.

6. The releasable end of claim 4, the releasing member further including a protuberance sized to fit within the aperture.

7. The releasable end of claim 6, the protuberance sized to engage the work piece when the work piece is positioned proximate to the engagement location absent the force exerted at the attachment location from the line.

8. The releasable end of claim 1, the hook member further including:
   an engagement location sized to engage the work piece; and
   an aperture sized to accept at least a portion of the releasing member.

9. The releasable end of claim 8, further including an attaching position and a releasing position, wherein said portion of the releasing member is positioned within the aperture when the releasable end is positioned in the releasing position and the releasing member is spaced from the engagement location when the releasable end is positioned in the attaching position.

10. A releasable end used with a line on a work piece, the releasable end comprising:
    an attachment member having a rod member, an engagement location sized to engage the work piece, and an aperture;
    a releasing member pivotally attached to the rod member and having a force location shaped to accept the line and a protuberance sized to fit within the aperture;
    a spring member positioned to bias the releasing member against the attachment member; and
    an attaching position and a releasing position, wherein the protuberance is positioned within the aperture when the releasable end is positioned in the releasing position and the protuberance is spaced from the engagement location when the releasable end is positioned in the attaching position.

11. The releasable end of claim 10, the attachment member further including a base positioned opposite the engagement location and a pair of armatures extending from the base to the engagement location, the base, armatures, and engagement location defining the aperture in the hook member.

12. The releasable end of claim 11, wherein:
    the armatures define a plane between the base and the engagement location,
    the plane is positioned between the protuberance and the engagement location when the releasable end is positioned in the attaching position; and
    the protuberance is positioned on the same side of the plane as the engagement location when the releasable end is positioned in the releasing position.

13. The releasable end of claim 10, the attachment member further including support stanchions and the rod member is attached to and positioned between the support stanchions.

14. The releasable end of claim 10, wherein the spring member is sized and shaped to allow rotation of the releasing member about the rod member relative to the attachment member upon a force from the line exerted at the force location.

15. The releasable end of claim 14, wherein the protuberance is sized to engage the work piece when the work piece is positioned proximate to the engagement location and the force from the line at the force location is absent.

16. A releasable end for a chalk-line apparatus having a line and spool, the chalk-line apparatus for use on a work piece, the releasable end comprising:
    a hook member having a rod member, an engagement location sized to engage the work piece, a base positioned opposite the engagement location; and a pair of armatures extending from the base to the engagement location, the armatures defining an aperture and a plane in the hook member;
    a releasing member pivotally attached to the rod member and having a line location shaped to accept the line and a protuberance sized to fit within the aperture;
    a spring positioned to bias the releasing member against the hook member, the spring sized and shaped to allow rotation of the releasing member about the rod member and relative to the hook member upon a force exerted at the line location from the line; and
    an attaching position and a releasing position, the plane is positioned between the protuberance and the engagement location when the releasable end is positioned in the attaching position and the protuberance is positioned on the same side of the plane as the engagement location when the releasable end is positioned in the releasing position.

17. The releasable end of claim 16, wherein the protuberance is sized to engage the work piece when the work piece is positioned proximate to the engagement location absent the force exerted at the attachment location from the line.

18. The releasable end of claim 16, wherein the hook member further includes support stanchions and the rod member is attached to and positioned between the support stanchions.

* * * * *